Sept. 2, 1924.
A. W. THOMPSON
1,506,793
TRANSFORMER GASKET
Filed Feb. 15, 1919
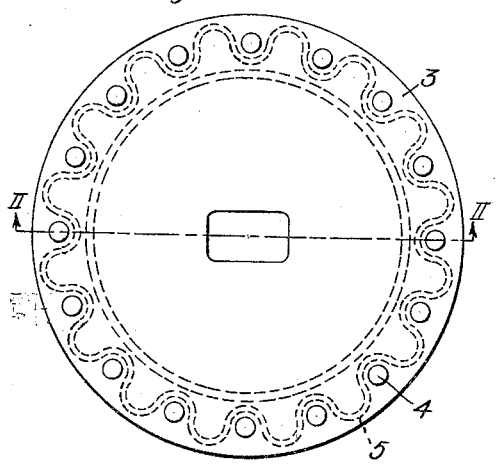
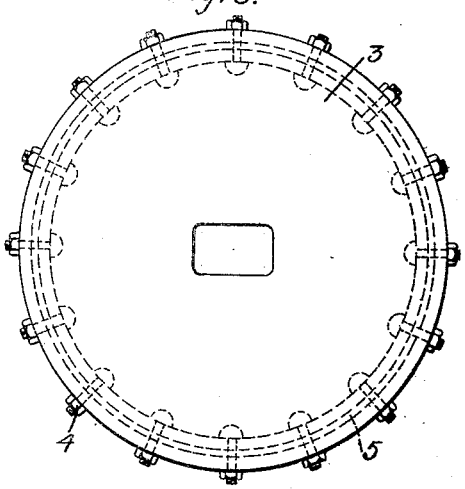
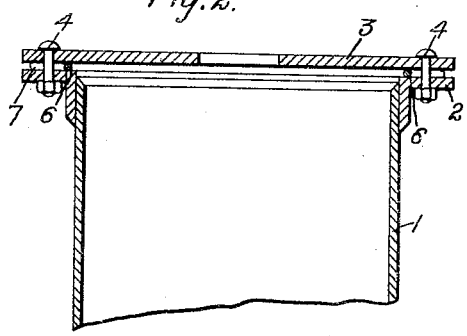
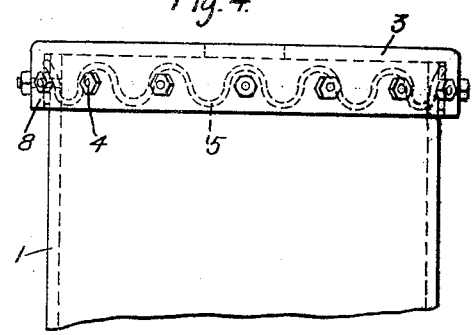
WITNESSES:
J. A. Helsel.
A. O. Brand
INVENTOR
Arthur W. Thompson.
BY
Wesley G. Carr
ATTORNEY

Patented Sept. 2, 1924.

1,506,793

UNITED STATES PATENT OFFICE.

ARTHUR W. THOMPSON, OF EAST McKEESPORT, PENNSYLVANIA, ASSIGNOR TO WESTINGHOUSE ELECTRIC & MANUFACTURING COMPANY, A CORPORATION OF PENNSYLVANIA.

TRANSFORMER GASKET.

Application filed February 15, 1919. Serial No. 277,184.

*To all whom it may concern:*

Be it known that I, ARTHUR W. THOMPSON, a citizen of the United States, and a resident of East McKeesport, in the county of Allegheny and State of Pennsylvania, have invented a new and useful Improvement in Transformer Gaskets, of which the following is a specification.

My invention relates to gaskets adapted to be interposed between containers and their covers and it has especial relation to gaskets of the character described which are formed from a slightly compressible metal, the use of which must be reduced to a minimum in order to avoid undue expense in installation.

In the accompanying drawing, Fig. 1 is a plan view of a portion of a container and its cover, having my gasket in position between them; Fig. 2 is a sectional view taken on the line II—II of Fig. 1; Fig. 3 is a plan view of my gasket, as used with a modified container structure and cover; and Fig. 4 is an elevational view of the structure shown in Fig. 3.

I find that, when a cover is placed upon a container having a flange that presents a considerable bearing surface for the cover, and a gasket is disposed therebetween, a fulcrum action will be obtained when fastening devices are passed through the cover to secure it to the flange container unless the bearing surface of the gasket material is of considerable width. This difficulty will be more fully explained in the following detailed description of a structure in which my gasket is utilized.

Moreover, when a gasket is interposed between a container and its cover, the container being filled with a fluid having great penetrating power, it is almost impossible to prevent such fluid from leaking out between the gasket and the fastening devices which extend therethrough. A further object of my invention, therefore, is to provide a gasket of such form and dimension that it may be disposed between a container and its cover in symmetrical relation to the devices which fasten the cover to the container without being penetrated or engaged by such devices. In other words, the surface defined by the axes of the fastening devices substantially bisects the gasket, though the devices themselves do not penetrate or engage the gasket material. It follows that the above mentioned fulcrum effect which has heretofore been present when strip gaskets were interposed between a container and its cover is avoided.

Referring now more particularly to Figs. 1 and 2 of the drawings, the upper portion of a container 1 is provided with a lip or flange 2 which is adapted to have a cover member 3 placed thereupon. Fastening devices 4 serve to bind the cover and the container together.

In order to prevent the leakage of any of the fluid which may be in the container 1, it is necessary to provide a gasket member 5 between the cover and the lip or flange 2 of the container. Heretofore, gaskets of two types have been employed, that of one type having a width so much greater than the fastening devices which were used that an adequate bearing surface was provided, both within and without the surface defined by the axes of the fastening devices. A gasket having such width, however, is expensive and, therefore, a relatively narrow strip of material has sometimes been utilized as a gasket. It is apparent that, if a narrow strip is mounted either within or without the surface defined by the axes of the fastening devices, the clamping operation of the latter will result in a fulcruming action and a consequent bulging of the cover.

For a better understanding of this effect, reference may be had to Fig. 2. Assuming for the moment, that the sectioned portion 6 of the gasket 5 represents a strip gasket which is disposed annularly inside the surface defined by the axes of fastening devices 4. It is obvious that, when the flange 2 and the edge of the cover 3 are drawn toward each other by the devices 4, the portion of the cover which is outside of the surface defined by the axes of the fastening devices will be bent downwardly about the gasket 6 as a fulcrum. Therefore, the clamping action of the devices 4 will result in a distinct bulging of the cover 3 at the center thereof. On the other hand, if a portion 7 of the gasket 5 is assumed, for the moment, to represent a strip gasket which is disposed annularly just outside of the surface defined by the axes of the fastening devices, it is again apparent that a fulcruming action will obtain, although not to so great an extent as in the case where the gasket was inside the surface defined by the axes of the fastening devices. However, when the narrow gasket is disposed as last indicated, the fluid which is contained within the vessel 1 may leak out between the fastening devices and either the cover or the flange of the container.

I propose, therefore, to utilize a relatively narrow, and therefore inexpensive, gasket, but to dispose the same in a sinuous manner so that as much bearing surface will be within the line of the fastening means as without that line. Moreover, I propose to so locate the fastening means with respect to the sinuous gasket that no opportunity is afforded for the fluid within the container 1 to leak out through the apertures through which contain the fastening devices 4.

In Figs. 3 and 4, I show a sinuous gasket utilized in a structure in which the cover 3 is provided with a flange 8 that surrounds the upper end of the container 1. All that has been said with respect to the function of such a narrow and sinuous gasket, in connection with the structure shown in Figs. 1 and 2, is true of the gasket when used in connection with the structures of Figs. 3 and 4.

While I have shown but two embodiments of my invention, it is obvious that those skilled in the art may apply the same in many different forms and to many different types and kinds of vessels, whether cylindrical or polygonal in cross section, in which gaskets of slightly compressible material are utilized. I desire, therefore, that my invention shall be limited only by the prior art or by the scope of the appended claims.

I claim as my invention:

1. A container, a cover therefor, a sinuous gasket disposed therebetween, and a plurality of clamping devices disposed in spaced relation between two concentric circles defined by the extremities of the gasket convolutions.

2. A container, a cover therefor, a sinuous gasket interposed therebetween, and fastening devices for securing the cover to the container and extending between the convolutions of said gasket.

3. A container, a cover therefor, a sinuous gasket interposed therebetween, and fastening devices for securing the cover to the container, substantially as much material of the gasket being on one side of the surface defined by the axes of the fastening devices as is on the other side thereof.

4. A container, a cover therefor, a sinuous gasket interposed therebetween, and fastening devices for securing the cover to the container, the axes of said fastening devices defining a surface that intersects the bearing surfaces of said gasket.

5. A container, a cover therefor, a sinuous gasket interposed therebetween and fastening devices for securing the cover to the container, the sinuosity of the gasket being such that, although its dimension in a direction substantially paral'el to the surfaces against which it is pressed is less than the dimension of each fastening device in the same direction, the surface defined by the axes of said devices substantially bisects the entire bearing surface of the gasket.

In testimony whereof, I have hereunto subscribed my name this 31st day of Jan., 1919.

ARTHUR W. THOMPSON.